US005371992A

United States Patent [19]

O'Berry

[11] Patent Number: 5,371,992

[45] Date of Patent: Dec. 13, 1994

[54] DEVICE TO ELIMINATE SQUEAKS IN FLOORS AND METHOD

[76] Inventor: Jon L. O'Berry, 664 Exmoor Ct., Crystal Lake, Ill. 60014

[21] Appl. No.: 45,292

[22] Filed: Apr. 16, 1993

[51] Int. Cl.[5] ........................ F16B 25/00; F16B 31/00; E04B 5/00

[52] U.S. Cl. .................................... 52/741.1; 411/383; 411/900; 411/411; 7/165; 81/451; 144/353; 52/741.2; 52/749; 52/750; 52/DIG. 1; 52/98

[58] Field of Search ..................... 52/98, 741.1, 741.2, 52/749, 750, 127.5, DIG. 1, 698, 704, 711, 291, 514; 411/383, 386, 411, 900, 2, 3, 5; 144/353; 81/451; 7/165

[56] References Cited

U.S. PATENT DOCUMENTS

| | | | |
|---|---|---|---|
| Re. 33,901 | 4/1992 | Shinjo . | |
| 264,776 | 9/1882 | Sharp | 52/514 |
| 2,636,194 | 4/1953 | Schneider | 411/411 X |
| 3,083,593 | 4/1963 | Cotter . | |
| 3,572,181 | 3/1971 | Schlegel . | |
| 3,763,725 | 10/1973 | Reiland . | |
| 4,053,982 | 10/1977 | Weissman . | |
| 4,062,165 | 12/1977 | Marks et al. | 52/514 |
| 4,139,036 | 2/1979 | Regan et al. | 145/46 |
| 4,258,607 | 3/1981 | McKewan | 411/2 X |
| 4,640,019 | 2/1987 | Paley . | |
| 4,659,267 | 4/1987 | Uno et al. | 411/5 |
| 4,662,806 | 5/1987 | Reed . | |
| 4,736,658 | 4/1988 | Jore | 81/451 |
| 4,888,926 | 12/1989 | Lutz | 52/291 |
| 4,958,972 | 9/1990 | Shinjo | 411/900 X |
| 5,179,813 | 1/1993 | Martinsen et al. | 52/743 |

FOREIGN PATENT DOCUMENTS

| | | | |
|---|---|---|---|
| 2549147 | 5/1977 | Germany | 411/900 |

*Primary Examiner*—Carl D. Friedman
*Assistant Examiner*—Robert J. Canfield
*Attorney, Agent, or Firm*—Mathew R. P. Perrone, Jr.

[57] ABSTRACT

At least one scored screw is driven into the squeak area with a specialized driving bit and an alignment and depth control fixture. The alignment and depth control fixture is used to direct the scored screw to the proper point into the floor so that the scored area is at or beneath the surface of the floor. The driving bit can stop driving the screw at the desired position. After the alignment and depth control fixture is removed, a gripping tool is used to apply force to the screw and break the screw at the prescored position. The barrel of the screw being left in the floor locks the floor or the step to the desired support. One screw or series of these screws in usually an arcuate or a radial fashion around the squeak area, can eliminate the squeak.

15 Claims, 7 Drawing Sheets

DEVICE TO ELIMINATE SQUEAKS IN FLOORS AND METHOD

This invention relates to a construction device and method, and more particularly to a screw for eliminating squeaks in floors and stairs in combination with a alignment and depth control fixture for the screw, and a driving bit for the screw together with a power source for the driving bit.

BACKGROUND OF THE INVENTION

In any construction procedure, especially in residential construction, almost any squeak may be undesirable. This is especially true in a load bearing surface, especially a surface subject to foot traffic such as floor or a stair.

A squeaky area in a structure subject to foot traffic is an indication of poor quality in that structure. In fact, it is quite possible to say that a floor squeak or a stair squeak is completely undesirable. Whether that indication of poor quality is accurate or merely perceived, it is highly desirable to eliminate the squeaky area accurately and efficiently.

A squeaky floor is highly undesirable. The same logic applies to a squeaky stair, because a squeaky stair is also highly undesirable. Yet, it is extremely difficult to provide a squeak-proof floor or a squeak-proof stair. Even if extra care is taken during construction to avoid such an occurence, shrinking or expanding of wood can still cause the squeak.

As the floor and subfloor (if necessary) are installed in a house and attached to the joists that support the floor or the stair tread is attached to the staircase, tight fittings can be made to avoid squeaks. However, over a period of time, the wood shrinks or expands thereby changing the structure of the original joint. A nail used may also become loose.

Any one or a combination of these changes can create a space. This space between the floor, the subfloor and the joist can cause a squeak when pressure is applied to the area around the space. In a similar fashion, the squeak can occur on a stair.

Once the squeaks occur, it is extremely difficult to eliminate the squeaks from the structure. A major effort is required to remove whatever decoration has been placed over the floor or the stair, to repair or to eliminate the squeaky area, and to restore the floor or the stair to its original appearance. There is a major reconstruction problem to remove the squeaky area and replace it with materials which will not squeak.

Furthermore, there is no perfect way to insure that the squeak is actually repaired at the time the repairs are finished. It is almost always necessary to restore the decoration and test for the squeak by the trial and error method. It thus becomes highly desirable to avoid this problem and simplify the elimination of the squeaks.

SUMMARY OF THE INVENTION

Among the many objectives of this invention is the provision of a scored screw capable of being driven into a squeak area accurately.

A further objective of this invention is to provide an alignment fixture for inserting a screw into a squeaky area.

A still further objective of this invention is to provide a driving bit for placing a screw into a squeaky area.

Yet a further objective of this invention is to provide an accurate method of removing a squeaky area.

Also an objective of this invention is to provide a method of restoring a decorative appearance to a squeaky area.

Another objective of this invention is to provide a simplified method of removing a squeaky area.

Yet another objective of this invention is to provide an accurate alignment and depth control fixture for driving a screw into a squeaky area.

Still another objective of this invention is to provide a method for driving a screw an appropriate distance into a squeaky area.

A further objective of this invention is to provide a scored screw capable being driven into a squeak area accurately, without removing a decorative covering over the squeak area.

A still further objective of this invention is to provide a driving bit with a collar stop to limit the distance a screw proceeds into a squeaky area.

These and other objectives of the invention (which other objectives become clear by consideration of the specification, claims and drawings as a whole) are met by providing at least one scored screw to be driven into the squeak area with a specialized driving bit and a alignment and depth control fixture. The alignment and depth control fixture can be used to direct the scored screw to the proper point while the driving bit can stop driving the screw at the desired position. After the alignment and depth control fixture is removed, a gripping tool applies torque or force to the screw, and breaks the screw at the prescored position. The barrel of the screw being left in the floor locks the floor or the step to the desired support. One or a series of these screws applied in usually an arcuate or a radial fashion around the squeak area, can eliminate the squeak.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
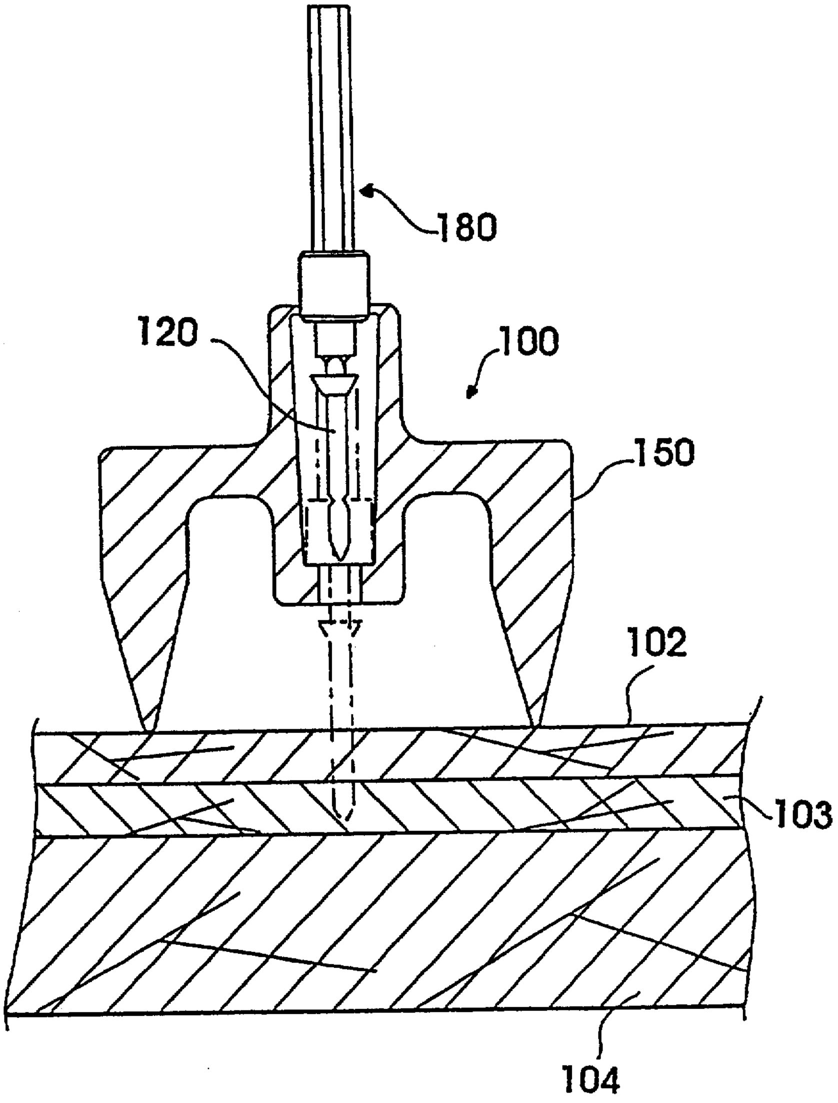
FIG. 1 depicts a side, partially cross-sectional view of the squeak removing device 100 of this invention including screw 120 suitable for eliminating a squeaky area.

Elimination of a squeaky area in a surface subject to foot traffic may be accomplished very efficiently, with an also simple restoration of the appropriate decoration to the squeaky area. Typical of the surface subject to foot trafic is a floor or a stair. The floor or the stair may be in a building or out in the open. In fact, it may be possible to eliminate the squeak without the need to remove any decoration, or to replace or to restore any decoration, which may be on the floor or the stair prior to the elimination of the squeak. At least one scored screw is driven into the squeaky area with a specialized driving bit and a special alignment and depth control fixture.

The alignment and depth control fixture can be used to direct the scored screw to the proper point while the driving bit can stop the screw at the desired position. After the position for the screw is reached, the alignment and depth control fixture can be removed from the screw. A gripping device is then used to apply torque or other force to the screw, and break the screw at the prescored position.

A preferred gripping device is a gripper which slides over the head of the screw to hold the screw head and permit force to be applied to the screw to break the screw at the prescored position. The gripper can be molded, cut or otherwise formed in the alignment and depth control fixture. Clearly, the gripper can also be a separate tool. The requirement for the gripper or other tool is that it simply and efficiently break the screw. The gripper slips easily onto the head of the screw for application of the breaking force.

When the head and shank of the scored screw is snapped off, the head along with an upper portion of screw separates at the scored area from a lower threaded portion or barrel of the screw. The lower threaded portion of the screw being left in the squeaky area locks the floor or stairs members, thereby eliminating the movement which causes the squeak. If movement still exists in adjacent areas, additional screws may be used, until the squeak is subtantially or entirely eliminated.

This screw locks the floor or the step members together to eliminate the movement which causes the squeak. One or a series of these screws, in usually an arcuate or a spiral fashion around the squeak area, can eliminate the squeak.

The scored screw is preferably of the self-drilling type. Customarily a hole does not have to be predrilled for the screw. With the screw drilling its own hole as the screw is applied, a tighter fit is achieved. The scored screw can have any suitable head capable of permitting the driving thereof. Another type of scored screw may be used as long as it has the holding power and driving power.

As the screw goes down into the desired squeak area through the floor into the subfloor and possibly the joist or through the stair into the riser or support, a point is reached on the alignment and depth control fixture and on the driving bit such that the score of the screw is at or below the surface of the floor.

The fixture gripper or similar device is applied to the head of the screw, with force sufficient to cause the screw to break at the score and remove the head of the screw, but leave the holding threaded part of the screw in place to, at least partially, eliminate the squeak. One or a series of such screws may be applied in the same around the squeak area, and eliminate the squeak.

The scored screw is driven directly through the carpeting into the floor. Carpeting may be removed to accomplish this feature. However, one main advantage of this device comes from the fact that it is highly desirable and clearly possible to drive a screw directly through the carpeting into the floor without removing any carpeting.

Such repairs are even possible on an uncarpeted floor. On a hardwood floor, it is possible to just make a very small, pilot hole and; then by using the alignment and depth control fixture, driver bit and scored screw, drive the scored screw into the pilot hole to the predetermined depth. The gripping device can then break off the screw. If necessary wood putty may be use to fill the hole appropriately, with very little tell-tale evidence on the problem with the hardwood floor.

The driving bit includes a collar, which prevents the bit from going further down the alignment and depth control fixture and driving the screw further into the floor than necessary. Thus, the head of the screw will be left above the floor and break off at the appropriate point so that the body of the screw is concealed completely within the floor and locks the floor or the stair to the appropriate support. As the circle of these screws expands, the squeak is greatly reduced.

The alignment and depth control fixture is basically a three pronged support. The three prongs determine a plane on which the alignment and depth control fixture may be set. The alignment and depth control fixture includes a center aperture through which the screw may be inserted followed by the driving bit. The driving bit may be driven by hand or by any approved power drive. In this fashion, the desired results of eliminating the squeak can be obtained.

In FIG. 1, squeak removing device 100 has screw 120 inserted through the alignment and depth control fixture 150. The driving bit 180 is pushing the screw 120 into the proper position. The screw 120 strikes the top floor 102, drills its own hole through the top floor 102 and then the subfloor 103, and possibly into joist 104.

At least one scored screw 120 is driven into the squeaky area with a specialized driving bit 180 and a special alignment and depth control fixture 150. The alignment and depth control fixture 150 can be used to direct the scored screw 120 to the proper point while the driving bit 180 can stop the screw 120 at the desired position.

The fixture gripper 151 or similar gripping device can then apply torque or other force to the screw 120, and break or snap the screw 120 at the prescored position of score 124. Fixture gripper 151 can be molded, machined, or otherwise formed in alignment and depth control fixture 150, as desired.

Power can be applied to the driving bit 180 in any suitable fashion. Any standard device may be used. Preferred as a power source is power screw driver. Also operable are an electric drill, a hand drill, a screw driver with an appropriate blade, a ratchet wrench or any other suitable powered or hand device.

Figure 2:
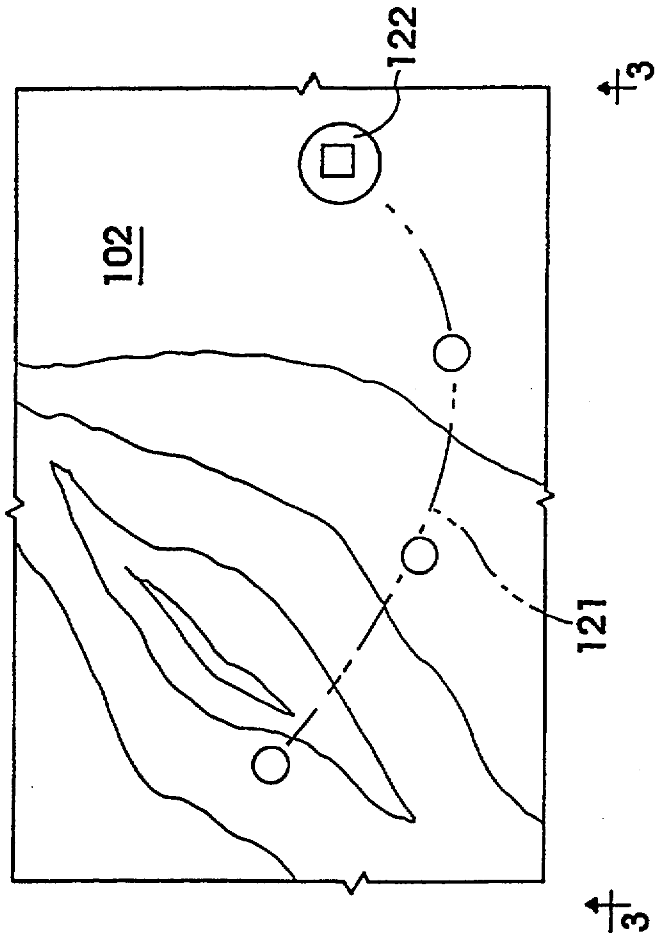
FIG. 2 depicts a top plan view of the screw 120 suitable for eliminating a squeaky area driven into floor 102.
Figure 3:
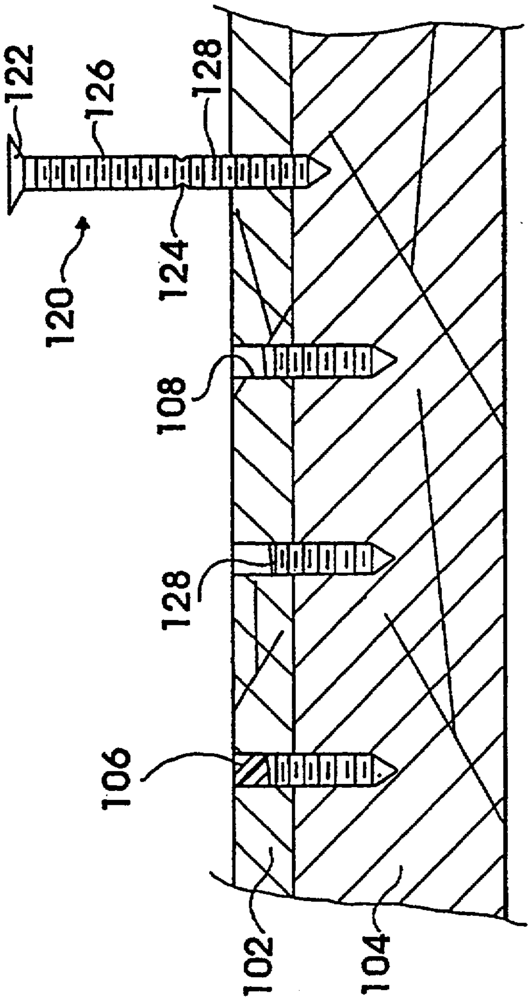
FIG. 3 depicts a side, partially cross-sectional view of the screw 120 suitable for eliminating a squeaky area driven into floor 102.

As shown in FIG. 2 and FIG. 3, when the screw 120 breaks, the head 122 separates at the score 124 along with an upper portion 126 of screw 120 separates from a lower thread portion or barrel 128 of the screw 120. Upper portion 126 is shown to be threaded but is operable if unthreaded. The barrel 128 of the screw 120 being left in the squeaky area locks part of the squeaky area to a support such as a stair riser (not shown), the subfloor 103 and possibly the joist 104, eliminates at least some movement in the squeaky area, and thereby eliminates at least part of the squeak. Putty 106 can fill screw aperture 108, in top floor 102 if the hole caused by screw 120 is exposed due to top floor 102 being an exposed hardwood floor.

With the score 124, a weak point, notch, or gash in the screw 120 is achieved. As torque is applied to screw 120, the score 124 causes the screw 120 fracture. This screw 120 locks the floor or the step to the desired support thereunder. One or a series of these screws 120, placed in a usually preferred, spiral fashion around the squeak area, can eliminate the squeak. A straight line, a spiral line or other line of screws 120 is also operable.

The screw 120 is most preferably of the self-drilling type. Customarily a hole does not have to be predrilled for the screw 120. With the screw 120 drilling its own hole as the screw 120 is applied, a tighter fit is achieved. Other screws are operable, but the self-drilling type gives the best results.

As the screw 120 goes down into the desired squeak area through the floor into the joist or through the stair into the riser or support, a point is reached on the alignment and depth control fixture 150 and on the driving bit 180 such that the score 124 is at or below the surface of top floor 102. By using the fixture gripper 151 on the alignment and depth control fixture 150, the shank 126 and head 122 of screw 120 is snapped off, while leaving the holding part or barrel 128 of the screw 120 at or below the surface of top floor 102. One or a series of such screws 120 may be applied in the same manner in a spiral 121 (FIG. 2) around the squeak area, and eliminate the squeak.

It is then possible to repair or replace any carpeting (not shown) if it is removed in the first place. However, it is most preferred to drive screw 120 directly through the carpeting into the floor without removing any carpeting. Again, the scored screw 120 is driven to a desired depth such that the score 124 is below the floor 102 surface. Using the fixture gripper 151 or other gripping device on the alignment and depth control fixture 150, it is possible to break screw 120 at score 124.

On a hardwood floor, it is possible to just make a very small, pilot hole and drive the screw 120 through the pilot hole. Then putty 106 is placed over barrel 128 in the hole caused by screw 120 appropriately, with very little tell-tale evidence of the problem when floor 102 is a hardwood floor.

Figure 4:
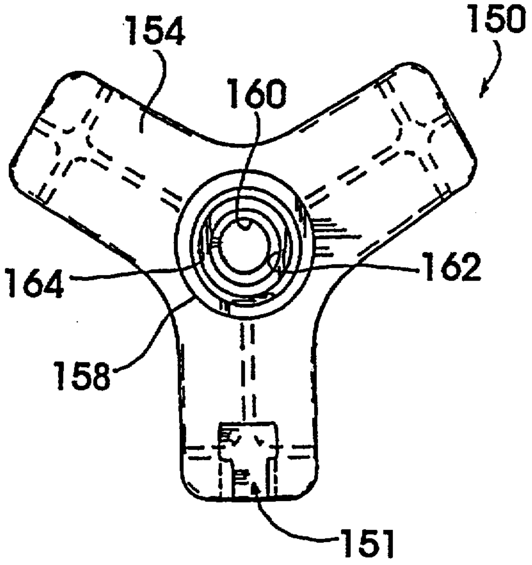
FIG. 4 depicts a top plan view of the alignment and depth control fixture 150 for screw 120 suitable for eliminating a squeaky area.
Figure 5:
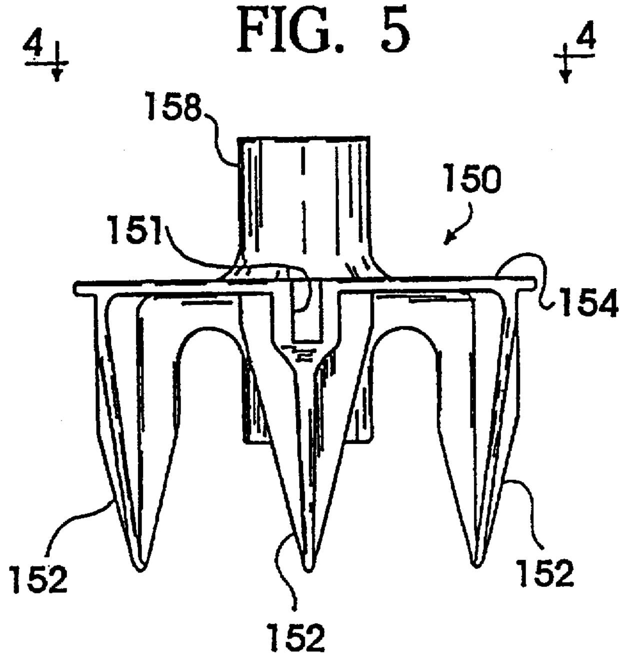
FIG. 5 depicts a side view of the alignment and depth control fixture 150 for screw 120 suitable for eliminating a squeaky area.

Referring now to FIG. 4 and FIG. 5, the alignment and depth control fixture 150 is basically a three legged support. Each leg 152 combines with the other legs 152 to determine a plane on which the alignment and depth control fixture 150 may be set. A leg 152 includes the fixture gripper 151 therein.

Each leg 152 extends into a platform arm 154. Each platform 154 is secured to a centrally located cylinder 158. Cylinder 158 has a small diameter section 160 of sufficient size for screw 120 to pass therethrough. Adjacent to small diameter section 160 is collar receiver 162. Collar receiver 162 is a little larger in diameter than small diameter section 160.

Collar receiver 162 is adjacent to driving bit receiver 164. The driving bit receiver 164 freely receives driving bit 180. So the screw 120 is inserted in the cylinder 158. Then driving bit 180 is applied to the screw 120. The driving bit 180 can be powered in any suitable fashion. Typical power sources are a ratchet, a wrench or even a power tool; none of which need to be shown herein.

Figure 6:
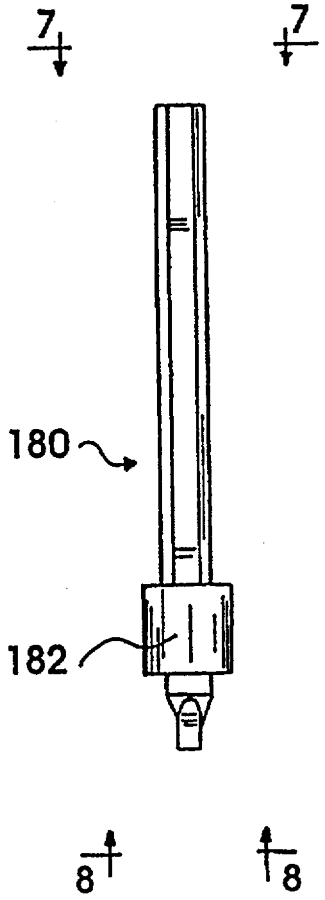
FIG. 6 depicts a side view of the driving bit 180 for screw 120 suitable for eliminating a squeaky area.
Figure 7:
FIG. 7 depicts a top plan view of the driving bit 180.
Figure 8:
FIG. 8 depicts a bottom plan view of the driving bit 180.

Considering FIG. 6, FIG. 7 and FIG. 8, the driving bit 180 includes a collar 182 secured thereto, which prevents the bit 180 from going further down the alignment and depth control fixture 150 and driving the screw 120 further into the top floor 102 than necessary. Collar receiver 162 combines with collar 182 to stop driving bit 180 at that point.

Figure 9:
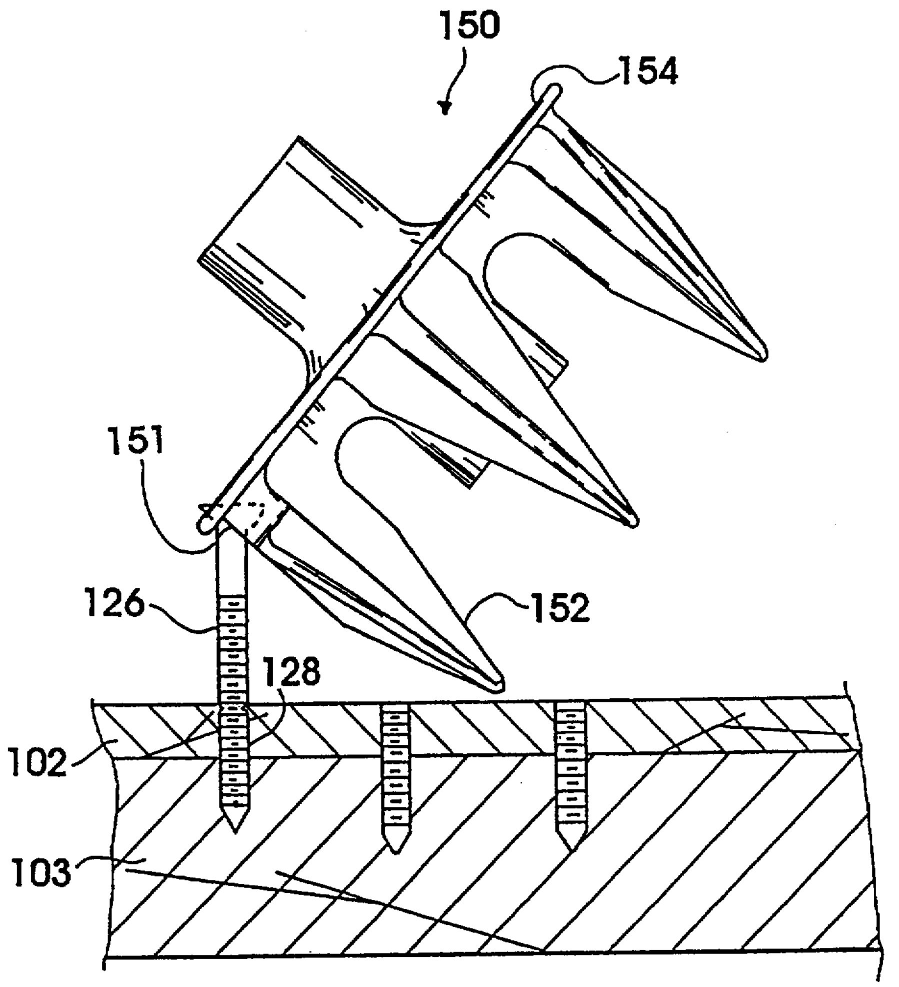
FIG. 9 depicts a side view of the alignment and depth control fixture 150 in use on screw 120.

Clearly indicated in FIG. 9, is the use of the alignment and depth control fixture 150 as a breaking device. The fixture gripper 151 or similar gripping device can then apply torque or other force to the screw 120, and break or snap the screw 120 at the prescored position of score 124. When the screw 120 breaks, the head 122 separates at the score 124 along with an upper portion 126 of screw 120 separates from a lower thread portion or barrel 128 of the screw 120. The barrel 128 holds the top floor 102 to the subfloor 103, and possibly into joist 104 (shown in FIG. 1).

Torque is applied to screw 120 to break the portion thereof that will be left above the floor and snap off at the appropriate point so that the barrel 128 of the screw 120 is concealed completely within the top floor 102 and locked the floor 102 or the stair (not shown) to the appropriate support. As the circle or arc of these screws 120 expands, the squeak is greatly reduced.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent is:

1. A method of eliminating a squeak from a structure subject to foot traffic comprising:

a) locating an area of the squeak;

b) applying an alignment and depth control fixture means to the area;

c) providing a scored screw having a head at a first end thereof and a point at a second end thereof, with a score between the head and point;

d) feeding the scored screw through the alignment and depth control fixture;

e) driving the scored screw a predetermined distance into the structure;

f) removing the alignment and depth control fixture means from the screw; and g) breaking the head from the point at the score.

2. The method of claim 1, further comprising:

a) applying the alignment and depth control fixture means to a second spot in the area;

b) providing a second, scored screw;

c) feeding the second, scored screw through the alignment and depth control fixture;

d) driving the second, scored screw a predetermined distance into the structure;

e) removing the alignment and depth control fixture means from the second screw; and f) breaking the head of the second screw from the point at the score.

3. The method of claim 2, further comprising:

a) applying the alignment and depth control fixture means to an additional spot in the area;

b) providing an additional, scored screw;

c) feeding the additional, scored screw through the alignment and depth control fixture;

d) driving the additional scored screw a predetermined distance into the structure;

e) removing the alignment and depth control fixture means from the additional screw; and f) breaking the head of the additional scored screw from the point at the score.

4. The method of claim 3, further comprising forming a spiral in the structure with the scored screw; the second scored screw; and the additional scored screw.

5. The method of claim 4, further comprising:

a) the structure having at least a top layer and a bottom layer;

b) the score of the scored screw being in the top layer of the structure; and c) the tip of the scored screw being in the bottom layer of the structure.

6. The method of claim 5, further comprising the structure being a floor.

7. The method of claim 5, further comprising the structure being a stair.

8. The method of claim 5, further comprising the scored screw; the second scored screw; and the additional scored screw each being a self-driving screw.

9. The method of claim 5, further comprising:

a) the structure subject to foot traffic having at least one layer between the top layer and the bottom layer;

b) the scored screw having a screw barrel between the tip and the score of the scored screw;

c) the screw barrel being of sufficient length to pass through the at least one layer; and d) the screw barrel being of sufficient length to penetrate both the top layer and the bottom layer.

10. The method of claim 3, further comprising:

a) the structure having at least a top layer and a bottom layer;

b) the score being in the top layer; and c) the tip being in the bottom layer.

11. The method of claim 10, further comprising the structure being a floor.

12. The method of claim 10, further comprising the structure being a stair.

13. A device for eliminating a squeaky area of a structure subject to floor traffic comprising:

a) a scored, self-driving screw being combined with a driving bit and an alignment and depth control fixture;

b) the alignment and depth control fixture having a first prong, a second prong and a third prong;

c) the first prong, the second prong and the third prong determining a plane on which the alignment and depth control fixture may be set;

d) the alignment and depth control fixture including a center aperture through which the screw may be inserted followed by the driving bit;

e) the center aperture including a lower narrow portion;

f) the driving bit including a collar; and g) the collar being of a sufficient size to prevent the passing of the driving bit through the lower narrow portion.

14. The device of claim 13 further comprising:

a) the alignment and depth control fixture further including a gripping member;

b) the gripping member being capable of gripping the screw; and c) the gripping member being capable of providing leverage to break the screw at the score to form a screw barrel including the tip and a top screw portion including the head.

15. An alignment and depth control fixture for guiding a scored, self-driving screw suitable into a squeaky area of a structure and for guiding a driving bit to the screw comprising:

a) the alignment and depth control fixture having a first prong, a second prong and a third prong;

b) the first prong, the second prong and the third prong determining a plane on which the alignment and depth control fixture may be set;

c) the alignment and depth control fixture including a center aperture through which the screw may be inserted followed by the driving bit;

d) the center aperture including a lower narrow portion;

e) the driving bit including a collar;

f) the collar being of a sufficient size to prevent the passing of the driving bit through the lower narrow portion;

g) the alignment and depth control fixture further including a gripping member;

h) the gripping member being capable of gripping the screw; and i) the gripping member being capable of providing leverage to break the screw at the score to form a screw barrel including the tip and a top screw portion including the head.

* * * * *